US012170667B2

(12) United States Patent
Wu

(10) Patent No.: US 12,170,667 B2
(45) Date of Patent: Dec. 17, 2024

(54) FAST ACCESS TO LOCAL AREA NETWORK (LAN) GRAPHICAL USER INTERFACE (GUI) BY CLIENT DEVICE

(71) Applicant: ARRIS Enterprises LLC, Suwanee, GA (US)

(72) Inventor: Yonghui Wu, Shenzhen (CN)

(73) Assignee: ARRIS ENTERPRISES LLC, Horsham, PA (US)

( * ) Notice: Subject to any disclaimer, the term of this patent is extended or adjusted under 35 U.S.C. 154(b) by 173 days.

(21) Appl. No.: 17/419,880

(22) PCT Filed: Jul. 21, 2020

(86) PCT No.: PCT/CN2020/103347
§ 371 (c)(1),
(2) Date: Jun. 30, 2021

(87) PCT Pub. No.: WO2022/016393
PCT Pub. Date: Jan. 27, 2022

(65) Prior Publication Data
US 2022/0329600 A1    Oct. 13, 2022

(51) Int. Cl.
*H04L 9/40*        (2022.01)
(52) U.S. Cl.
CPC .......... *H04L 63/101* (2013.01); *H04L 63/083* (2013.01)
(58) Field of Classification Search
CPC ... H04L 63/101; H04L 63/083; H04W 12/069
(Continued)

(56) References Cited

U.S. PATENT DOCUMENTS 10,111,159 B2 * 10/2018 Scahill .................. H04W 48/00
2009/0288150 A1 * 11/2009 Toomim .............. G06F 21/6218
726/5

(Continued)

FOREIGN PATENT DOCUMENTS

CN        103987130       8/2014
CN        105101349       11/2015
(Continued)

OTHER PUBLICATIONS

The Intrusion Detection System design in WLAN based on rogue AP, Peng et al, Apr. 2010 (Year: 2010).*

(Continued)

*Primary Examiner* — Jahangir Kabir
(74) *Attorney, Agent, or Firm* — Wenderoth, Lind & Ponack, L.L.P.

(57) ABSTRACT

A network device for providing a LAN GUI to a client device. The network device receives a request for access by the client device to the LAN GUI. The network device analyzes a LAN GUI access whitelist and determines whether the client device is in the LAN GUI access whitelist. The client device is granted access to the LAN GUI without receiving a password from the client device when the client device is determined to be in the LAN GUI access whitelist. An address entry page may be presented to add the MAC address of the client device to the LAN GUI access whitelist and a password page may be presented to display the LAN GUI password. When the client device is not in the LAN GUI access list, a login page is presented for entering the password to obtain access to the LAN GUI.

20 Claims, 4 Drawing Sheets

(58) Field of Classification Search
USPC .............................................................. 726/4
See application file for complete search history.

(56) References Cited

U.S. PATENT DOCUMENTS

| | | | |
|---|---|---|---|
| 2017/0230373 A1* | 8/2017 | Kadur ..................... | H04L 67/02 |
| 2017/0272317 A1 | 9/2017 | Singla et al. | |
| 2017/0331692 A1* | 11/2017 | Hague ................. | H04L 41/0893 |
| 2019/0380020 A1 | 12/2019 | Pellegrini et al. | |

FOREIGN PATENT DOCUMENTS

| | | |
|---|---|---|
| CN | 108123944 | 6/2018 |
| CN | 111132137 | 5/2020 |

OTHER PUBLICATIONS

International Search Report and Written Opinion of the International Searching Authority issued Apr. 21, 2021, in International (PCT) Application No. PCT/CN2020/103347.

* cited by examiner

FAST ACCESS TO LOCAL AREA NETWORK (LAN) GRAPHICAL USER INTERFACE (GUI) BY CLIENT DEVICE

BACKGROUND

The subject matter of the present disclosure relates to accessing a local area network (LAN) graphical user interface (GUI) without providing a password.

SUMMARY

Aspects of the present disclosure are drawn to a network device for providing a LAN GUI to a client device without receiving a password from the client device. The network device receives a request for access by the client device to the LAN GUI. The network device analyzes a LAN GUI access whitelist and determines whether the client device is in the LAN GUI access whitelist. The client device is granted access to the LAN GUI without receiving a password from the client device when the client device is determined to be in the LAN GUI access whitelist.

An address entry page may be presented to add the MAC address of the client device to the LAN GUI access whitelist and a password page may be presented to display the LAN GUI password. When the client device is not in the LAN GUI access list, a login page is presented for entering the password to obtain access to the LAN GUI.

BRIEF SUMMARY OF THE DRAWINGS

The accompanying drawings, which are incorporated in and form a part of the specification, illustrate example embodiments and, together with the description, serve to explain the principles of the present disclosure. In the drawings.

While implementations are described herein by way of example, those skilled in the art will recognize that the implementations are not limited to the examples or figures described. It is understood that the figures and detailed description thereto are not intended to limit implementations to the particular form disclosed but, on the contrary, the intention is to cover modifications, equivalents, and alternatives falling within the spirit and scope as defined by the appended claims. The headings used herein are for organizational purposes and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean "including, but not limited to."

DETAILED DESCRIPTION

A LAN GUI is used to configure access to a network, to configure network parameters, and to manage operation of the network device. For example, if the network becomes congested, the user may want to login to the LAN GUI to analyze whether someone else is using the network that causes the network to become congested. The LAN GUI password is entered to determine if the client device will be granted access to the LAN GUI. However, passwords are often forgotten, and if the customer forgets the password, a factory reset to the network device, such as a router, modem, or gateway, is necessary to reset the password to the default GUI password.

The subject matter of the present disclosure provides a method to grant access by a client device to the LAN GUI without the client device providing a LAN GUI password. If the password for accessing the LAN GUI is forgotten, access may be granted based on identification of a client device in a LAN GUI access list.

Figure 1:
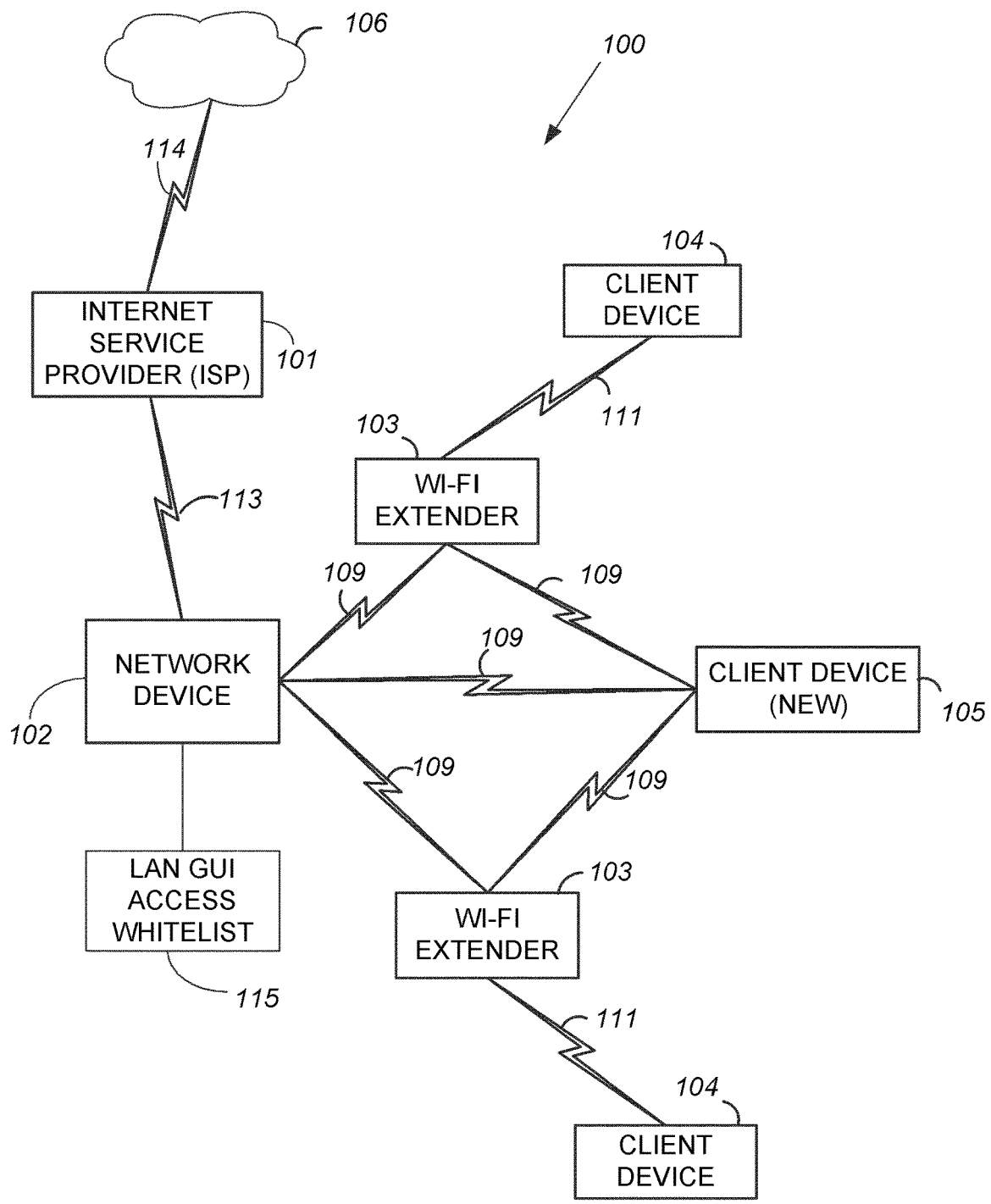
FIG. 1 is a schematic diagram of a system.

FIG. 1 is a schematic diagram of a system 100.

As shown in FIG. 1, the system includes a network device 102 connected to the Internet 106 via an Internet Service Provider (ISP) 101 and also connected to different wireless devices such as wireless extenders 103 and client devices 104, 105. The system shown in FIG. 1 includes wireless devices (e.g., wireless extenders 103 and client devices 104, 105) that may be connected in one or more wireless networks (e.g., private, guest, iControl, backhaul network, or Internet of things (IoT) network) within the system. Additionally, there could be some overlap between wireless devices (e.g., wireless extenders 103 and client devices 104, 105) in the different networks. That is, one or more network devices could be located in more than one network. For example, the wireless extenders 103 could be located both in a private network for providing content and information to a client device 104 and also included in a backhaul network or an iControl network.

Starting from the top of FIG. 1, the ISP 101 can be, for example, a streaming video provider or any computer for connecting the network device 102 to the Internet 106. The connection 114 between the Internet 106 and the ISP 101 and the connection 113 between the ISP 101 and the network device 102 can be implemented using a wide area network (WAN), a virtual private network (VPN), metropolitan area networks (MANs), system area networks (SANs), a DOCSIS network, a fiber optics network (e.g., FTTH (fiber to the home) or FTTX (fiber to the x), or hybrid fiber-coaxial (HFC)), a digital subscriber line (DSL), a public switched data network (PSDN), a global Telex network, or a 2G, 3G, 4G or 5G network, for example.

The connection 113 can further include as some portion thereof a broadband mobile phone network connection, an optical network connection, or other similar connections. For example, the connection 113 can also be implemented using a fixed wireless connection that operates in accordance with, but is not limited to, 3rd Generation Partnership Project (3GPP) Long Term Evolution (LTE) or 5G protocols. It is also contemplated by the present disclosure that connection 113 is capable of providing connections between the network device 102 and a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G or 5G network, for example.

The network device 102 can be, for example, a hardware electronic device that may be a combination modem and gateway device that combines the functions of a modem, an access point, and/or a router for providing content received from the content provider (e.g., ISP 101) to network devices (e.g., wireless extenders 103 and client devices 104, 105) in the system. It is also contemplated by the present disclosure that the network device 102 can include the function of, but is not limited to, an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content.

The connections 109 between the network device 102, the wireless extenders 103, and client devices 104, 105 can be implemented using a wireless connection in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the citizens broadband radio service (CBRS) band, 2.4 GHz bands, 5 GHz bands, or 6 GHz bands. Additionally, the connections 109 can be implemented using a wireless connection that operates in accordance with, but is not limited to, RF4CE protocol, ZigBee protocol, Z-Wave protocol, or IEEE 802.15.4 protocol. It is also contemplated by the present disclosure that the connections 109 can include connections to a media over coax (MoCA) network. One or more of the connections 109 can also be a wired Ethernet connection.

The wireless extenders 103 can be, for example, hardware electronic devices such as access points used to extend the wireless network by receiving the signals transmitted by the network device 102 and rebroadcasting the signals to, for example, client devices 104, 105, which may out of range of the network device 102. The wireless extenders 103 can also receive signals from the client devices 104, 105 and rebroadcast the signals to the network device 102, or other client devices 104, 105.

The connections 111 between the wireless extenders 103 and the client devices 104, 105 are implemented through a wireless connection that operates in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands. Additionally, the connection 111 can be implemented using a wireless connection that operates in accordance with, but is not limited to, RF4CE protocol, ZigBee protocol, Z-Wave protocol, or IEEE 802.15.4 protocol. Also, one or more of the connections 111 can be a wired Ethernet connection.

The client devices 104, 105 can be, for example, handheld computing devices, personal computers, electronic tablets, smart phones, smart speakers, IoT devices, iControl devices, portable music players with smart capabilities capable of connecting to the Internet, cellular networks, and interconnecting with other devices via Wi-Fi and Bluetooth, or other wireless hand-held consumer electronic devices capable of executing and displaying content received through the network device 102. Additionally, the client devices 104, 105 can be a TV, an IP/QAM STB or an SMD that is capable of decoding audio/video content and playing over OTT or MSO provided content received through the network device 102.

The connection 109 between the network device 102 and the client device 104 is implemented through a wireless connection that operates in accordance with, but is not limited to, any IEEE 802.11 protocols. Additionally, the connection 109 between the network device 102 and the client device 104 can also be implemented through a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G or 5G network, for example.

The connection 109 can also be implemented using a wireless connection in accordance with Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands. One or more of the connections 10 can also be a wired Ethernet connection.

Figure 2:
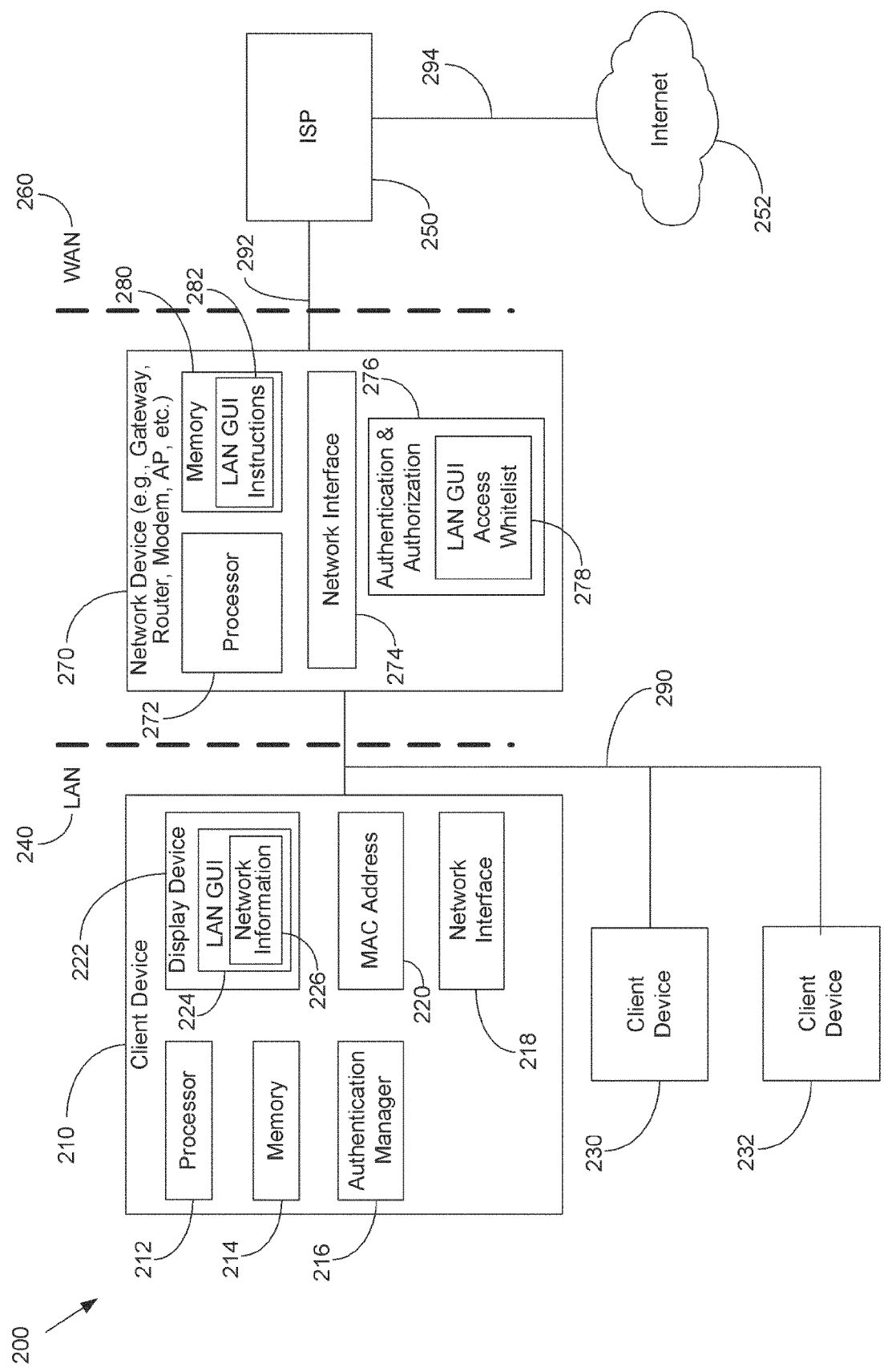
FIG. 2 illustrates a system block diagram that provides access to a local area network (LAN) graphical user interface (GUI) without providing a password.

A detailed description of the exemplary internal components of the network device 102, the wireless extenders 103, and the client devices 104, 105 shown in FIG. 1 will be provided in the discussion of FIG. 2. However, in general, it is contemplated by the present disclosure that the network device 102, the wireless extenders 103, and the client devices 104, 105 include electronic components or electronic computing devices operable to receive, transmit, process, store, and/or manage data and information associated with the system, which encompasses any suitable processing device adapted to perform computing tasks consistent with the execution of computer-readable instructions stored in a memory or a computer-readable recording medium.

Further, any, all, or some of the computing components in the network device 102, the wireless extenders 103, and the client devices 104, 105 may be adapted to execute any operating system, including Linux, UNIX, Windows, MacOS, DOS, and ChromOS as well as virtual machines adapted to virtualize execution of a particular operating system, including customized and proprietary operating systems. The network device 102, the wireless extenders 103, and the client devices 104, 105 are further equipped with components to facilitate communication with other computing devices over the one or more network connections to local and wide area networks, wireless and wired networks, public and private networks, and any other communication network enabling communication in the system.

Client device 105 is shown as being new and needs to join the network through network device 102. The network device 102 receives a request for access by the client device to a local area network (LAN) graphical user interface (GUI). If the network becomes congested, client device 105 may already be connected to the network and may want to login to the LAN GUI to determine the source of the network congestion. Network device 102 analyzes a LAN GUI access whitelist 115 and determines whether a media access control (MAC) address of the client device 105 is in the LAN GUI access whitelist 115. The network device 102 controls access by the client device 105 to the LAN GUI based on determining whether the media access control (MAC) address of the client device 105 is in the LAN GUI access whitelist 115.

If the MAC address of the client device 105 is in the LAN GUI access whitelist 115, the client device 105 is granted access to the LAN GUI without the client device 105 providing a password. If the MAC address of the client device 105 is not in the LAN GUI access whitelist 115, the client device 105 is directed to a login page for entering a password to access the LAN GUI. A page is presented to add the MAC address of the client device 105 to the LAN GUI access whitelist 115 based on the client device having access to the LAN GUI. The network device 102 receives the password entered by the client device 105 on the login page.

FIG. 2 illustrates a system block diagram 200 that provides access to a local area network (LAN) graphical user interface (GUI) without requiring a password.

In FIG. 2, client devices 210, 230, 232 are shown in a LAN 240. Client device 210 includes a processor 212 and memory 214. An authentication manager 216 is provided for authenticating client device 210 with network device 270. Network device 270 is positioned between the LAN side 240 and wide area network side 260. The network device 270 may be a gateway, router, modem, access point (AP), etc. The network device 270 provides access by client devices 210, 230, 232 to the Internet Service Provider (ISP) 250. The ISP 250 provides the client devices 210, 230, 232 access to the Internet 252.

Returning to client device 210, a network interface 218. Network interface 218 is the point of interconnection between client device 210 and network device 270. Network interface 218 may be implemented using a network interface card (NIC). Alternatively, the network interface 218 can be implemented as a processor, and the software/instructions for implementing network interface 218 may be stored in memory 214.

The client device has a media access control (MAC) address 220. MAC address 220 is a unique identifier assigned to a network interface 218 for use as a network address in communications within a network segment. Each of client devices 210, 230, 232 include a unique basic service set identifier (BSSID), which is the MAC address 220, at least until a user changes the MAC address. Within the Open Systems Interconnection (OSI) network model, MAC address 220 is used in the medium access control protocol sublayer of the data link layer. As typically represented, the MAC address 220 is a recognizable series of hexadecimal digits, separated by hyphens, colons, or without a separator. The MAC address 220 is primarily assigned by a device manufacturer. The MAC address 220 can be stored in hardware, such as a network interface 218 or in memory 214. Network interfaces, however, may support changing the MAC address 220.

Client device 210 may include a display device 222 that presents the LAN GUI 224 to the user for controlling the configuration of the network device 270 and to view data associated with the network device 270. LAN GUI 224 presents network information 226. For example, LAN GUI 224 may initially presents a factory default configuration that allows access the Internet 252 after installation. The LAN GUI allows the user to change network information 226, which may include the default login password, the default wireless network name (Service Set Identifier (SSID), the Wireless LAN default security setting (e.g., the encryption method, the network key, and a Wi-Fi Protected Setup (WPS) PIN). Network information 226 may also include network configuration parameters, network statistics, etc.

Network device 270 includes processor 272, network interface 274, authentication and authorization controller 276, and memory 280. Authentication and authorization controller 276 uses a LAN GUI access whitelist 278 to determine if a client device 210 may access the LAN GUI instructions 282 without providing a password. Processor 272 of network device 270 uses authentication and authorization component 276 to analyze LAN GUI access whitelist 278 to determine whether the client device 210 is in the LAN GUI access whitelist 278.

Memory 280 stores instructions for implementing the LAN GUI instructions 282. Client devices 210, 230, 232 communicate with each other and with network device 270 using a LAN side communication network 290. LAN side communication network 290 may be a wired network or a wireless network. Network device 270 communications with ISP 250 using a WAN side communication network 292. WAN side communication network 292 may also be a wired network or a wireless network. ISP 250 access the Internet 252 using a high-speed communication network 294, such as a fiber optic network.

Figure 3:
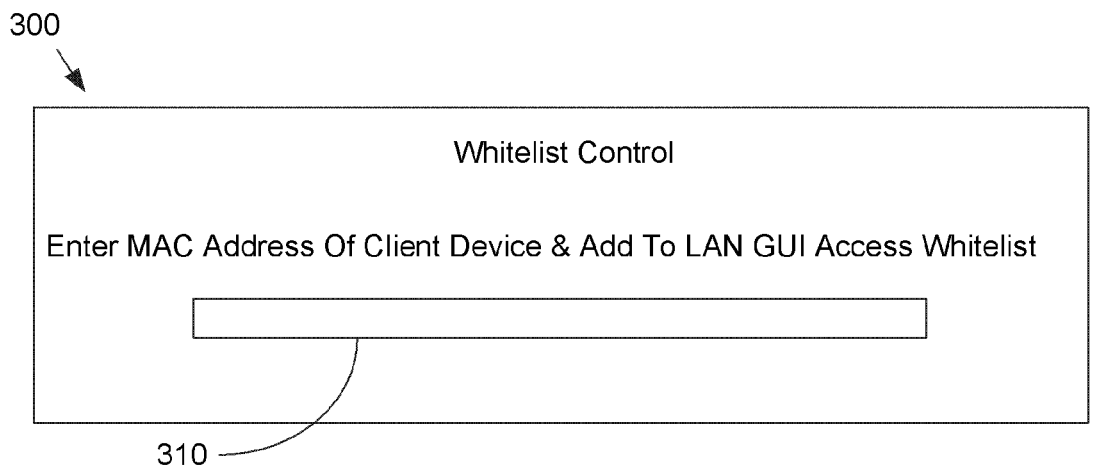
FIG. 3 illustrates a whitelist control user interface.

FIG. 3 illustrates a whitelist control user interface 300.

In FIG. 3, whitelist control user interface 300 provides an entry area 310 where a user may enter a MAC address of client device and add to the LAN GUI whitelist. The whitelist control user interface 300 allows the MAC address of the client device to be changed from a MAC address assigned by a device manufacturer to a new MAC address.

Figure 4:
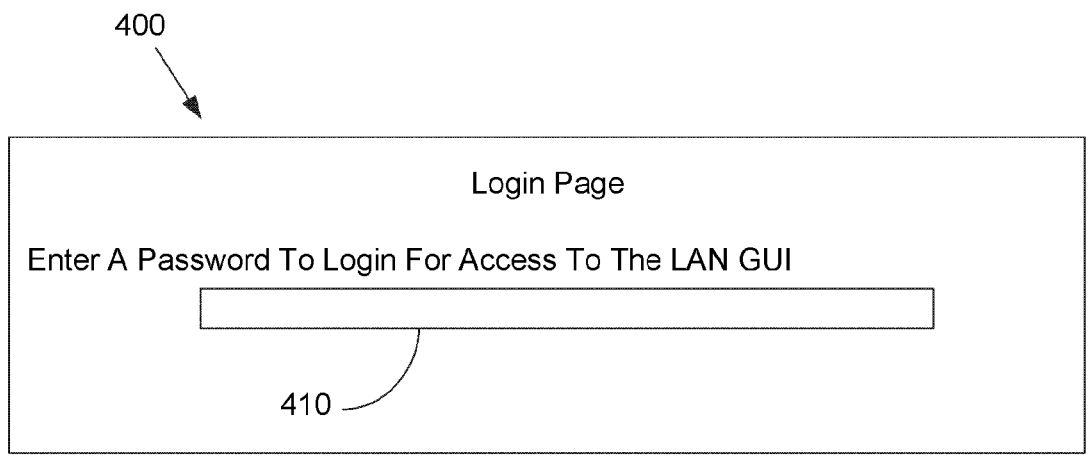
FIG. 4 illustrates a login page.

FIG. 4 illustrates a login page 400.

Login page 400 allows the user to enter a LAN GUI access password in an area 410 that the user selects to enter the password. When the user enters the correct password in area 410, the user is allowed to access the LAN GUI. Referring to FIG. 2, the user may then access the LAN GUI 224 to view network information 226, which may include the default login password, the default wireless network name (Service Set Identifier (SSID), the Wireless LAN default security setting (e.g., the encryption method, the network key, and a Wi-Fi Protected Setup (WPS) PIN)). Network information 226 may also include network configuration parameters, network statistics, etc. The LAN GUI 224 may also allow the client device 210 to modify the password.

Figure 5:
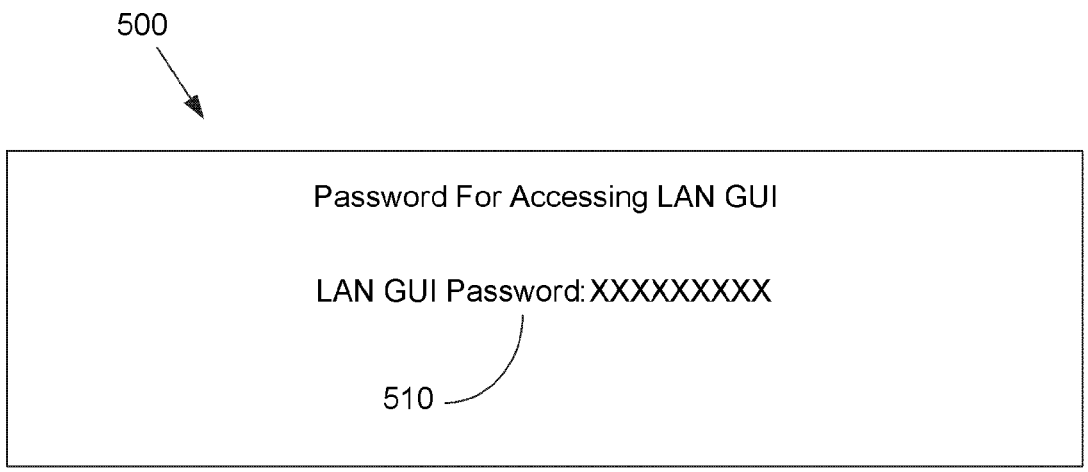
FIG. 5 illustrates a password interface.

FIG. 5 illustrates a password interface 500.

In FIG. 5, password interface 500 presents the LAN GUI password 510. The LAN GUI password 510 is entered to determine if the client device will be granted access to the LAN GUI. However, entry of the password 510 is not needed if the client device is in the LAN GUI access whitelist. The client device 105 is granted access to the LAN GUI without providing the password 510. If the client device 105 is not in the LAN GUI access whitelist 115, then the client device 105 is directed to a login page for entering the password 510 to access the LAN GUI.

While FIGS. 3-5 show separate pages for whitelist control, login, and for password display, different aspects described herein may be combined in a single user interface.

Figure 6:
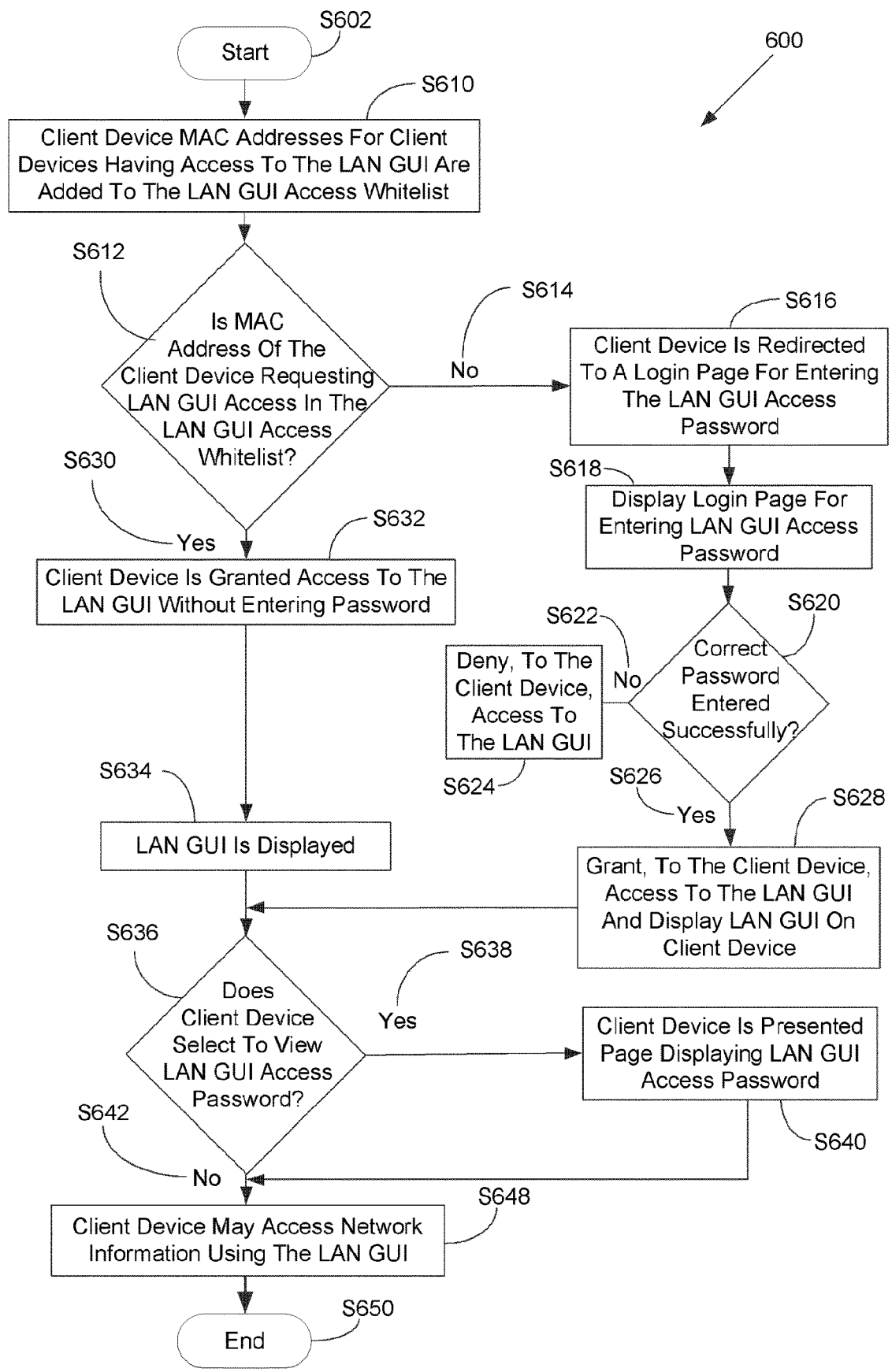
FIG. 6 is a flow chart of a method for controlling access to the LAN GUI without requiring the user to enter a password.

FIG. 6 is a flow chart of a method 600 for controlling access to the LAN GUI without requiring the user to enter a password. The flow chart of FIG. 6 is an algorithm representing instructions that are executed by the processor of the device.

In FIG. 6, method 600 starts (S602), and client device MAC addresses for client devices having access to the LAN GUI are added to the LAN GUI access whitelist (S610). For example, returning to FIG. 2, client device 210 includes MAC address 220. Each of client devices 210, 230, 232 include a unique basic service set identifier (BSSID), which is the MAC address 220, at least until a user changes the MAC address. The MAC address 220 is primarily assigned by a device manufacturer. The MAC address 220 can be stored in hardware, such as a network interface 218 or in memory 214. Network interfaces, however, may support changing the MAC address 220. Referring to FIG. 3, a whitelist control user interface 300 provides an entry area 310 where a user may enter a MAC address of a client device that is added to the LAN GUI access whitelist. The whitelist control user interface 300 allows the MAC address of the client device to be changed from a MAC address assigned by a device manufacturer to a new MAC address.

Returning to FIG. 6, a determination is made whether the MAC address of the client device requesting LAN GUI access is in the LAN GUI access whitelist (S612). Returning to FIG. 2, for example, the authentication and authorization component 278 of the network device 270 analyzes the LAN GUI access whitelist 278. Returning back to FIG. 6, when the MAC address of the client device that is requesting LAN GUI access is not in the LAN GUI access whitelist (S614), the client device is redirected to a login page for entering the LAN GUI access password (S616). A login page for entering LAN GUI access password is displayed (S618). Referring to FIG. 4, a login page 400 is shown having an area 410 for entering a password.

A determination is made whether the correct password was entered successfully (S620). When the correct password was not entered successfully (S622), access by the client device to the LAN GUI is denied (S624). When the correct password was entered successfully (S626), access to the LAN GUI by the client device is granted and the LAN GUI is display on client device (S628). Returning to FIG. 2, for example, client device 210 includes a display device 222 for presenting the LAN GUI 224. Network device 270 includes LAN GUI instructions 282 in memory 280 for providing the LAN GUI 224 for presentation by display device 222. Returning to FIG. 6, when the MAC address of the client device requesting LAN GUI access is in the LAN GUI access whitelist (S630), the client device is granted access to the LAN GUI without entering password (S632). The LAN GUI is then displayed (S634). For example, as described with reference to FIG. 2, processor 272 of network device 270 uses authentication and authorization component 276 to analyze LAN GUI access whitelist 278 to determine whether the client device 210 is in the LAN GUI access whitelist 278.

After the LAN GUI is displayed (S634), or after access to the LAN GUI by the client device is granted and the LAN GUI is display on client device (S628), a determination is made whether the client device selects to view LAN GUI access password (S636). When the client device selects to view the LAN GUI access password (S638), the client device is presented a page displaying LAN GUI access password (S640). Returning to FIG. 5, a page 500 is shown that identifies the LAN GUI password 510. When the client device does not select to view the LAN GUI access password (S642), the client device may access network information using the LAN GUI (S648). With reference to FIG. 2, client device 210 presents the LAN GUI 224 on display device 222. LAN GUI 224 may present network information 226, which may include the default login password, the default wireless network name (Service Set Identifier (SSID), the Wireless LAN default security setting (e.g., the encryption method, the network key, and a Wi-Fi Protected Setup (WPS) PIN)). Network information 226 may also include network configuration parameters, network statistics, etc. Returning to FIG. 6, the method 600 then ends (S650).

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a computer program product including one or more non-transitory computer-readable storage media having stored thereon instructions (in compressed or uncompressed form) that may be used to program a computer (or other electronic device) to perform processes or methods described herein. The computer-readable storage media may include one or more of an electronic storage medium, a magnetic storage medium, an optical storage medium, a quantum storage medium, or the like. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program may be configured to access, including signals transferred by one or more networks. For example, a transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A network device for use with a client device of one or more client devices, said network device comprising:
   a memory having stored thereon a local area network (LAN) graphical user interface (GUI) access whitelist and instructions; and
   a processor configured to execute the instructions stored on said memory to cause the network device to:
   receive a request for access by the client device to a LAN GUI that presents network information, wherein the LAN GUI is used to any of configure access to a network, configure one or more network parameters, manage operation of the network device, or any combination thereof;
   determine whether the client device is in the LAN GUI access whitelist, wherein the LAN GUI access whitelist comprises one or more MAC addresses of one or more client devices, and wherein at least one of the one or more MAC addresses, entered by a user via the LAN GUI, is a new MAC address different from an assigned MAC address by a device manufacturer; and control access by the client device to the LAN GUI based on determining whether the client device is in the LAN GUI access whitelist, wherein access includes viewing a password to access the LAN GUI, accessing network information, or both.

2. The network device of claim 1, wherein the client device is granted access to the LAN GUI without receiving the password from the client device based on a MAC address of the client device determined to be present in the LAN GUI access whitelist.

3. The network device of claim 1, wherein a login page for entering the password to access the LAN GUI is presented to the client device based on a MAC address of the client device determined to not be present in the LAN GUI access whitelist.

4. The network device of claim 1, wherein the processor is further configured to execute the instructions stored on said memory to cause the network device to:

present a first page to add a MAC address of the client device to the LAN GUI access whitelist based on the client device having access to the LAN GUI.

5. The network device of claim 1, wherein the processor is further configured to execute the instructions stored on said memory to cause the network device to:

present a login page for entering the password for obtaining access to the LAN GUI based on the client device determined to not be in the LAN GUI access whitelist.

6. The network device of claim 5, wherein the processor is further configured to execute the instructions stored on said memory to cause said network device to receive the password entered by the client device on the login page presented to the client device.

7. The network device of claim 1, wherein the processor is further configured to execute the instructions stored on said memory to cause said network device to:

present a first page to add a MAC address of the client device to the LAN GUI access whitelist based on the client device having access to the LAN GUI;

present a second page of the LAN GUI to display the password for access to the LAN GUI based on the MAC address of the client device determined to be in the LAN GUI access whitelist; and present a third page for entering the password for obtaining access to the LAN GUI based on the MAC address of the client device determined to not be in the LAN GUI access whitelist.

8. A method to authorize a client device of one or more client devices access to a local area network (LAN) without using a password, comprising:

storing a LAN graphical user interface (GUI) access whitelist in memory;

receiving a request for access by the client device to a LAN GUI that presents network information, wherein the LAN GUI is used to any of configure access to a network, configure one or more network parameters, manage operation of the network device, or any combination thereof;

determining whether the client device is in the LAN GUI access whitelist, wherein the LAN GUI access whitelist comprises one or more MAC addresses of one or more client devices, and wherein at least one of the one or more MAC addresses, entered by a user via the LAN GUI, is a new MAC address different from an assigned MAC address by a device manufacturer; and controlling access by the client device to the LAN GUI based on determining whether the client device is in the LAN GUI access whitelist, wherein access includes viewing a password to access the LAN GUI, accessing network information, or both.

9. The method of claim 8 further comprising granting the client device access to the LAN GUI without receiving the password from the client device based on the client device determined to be present in the LAN GUI access whitelist.

10. The method of claim 8 further comprising presenting a login page for entering the password for the client device to access the LAN GUI based on a MAC address of the client device determined to not be present in the LAN GUI access whitelist.

11. The method of claim 8 further comprising:

presenting a first page to add a MAC address of the client device to the LAN GUI access whitelist based on the client device having access to the LAN GUI.

12. The method of claim 8 further comprising:

present a login page for entering the password for obtaining access to the LAN GUI based on the client device determined to not be in the LAN GUI access whitelist.

13. The method of claim 12 further comprising receiving the password entered by the client device on the login page presented to the client device.

14. The method of claim 8 further comprising:

presenting a first page to add a MAC address of the client device to the LAN GUI access whitelist based on the client device having access to the LAN GUI;

presenting a second page of the LAN GUI to display the password for access to the LAN GUI based on the MAC address of the client device determined to be in the LAN GUI access whitelist; and presenting a third page for entering the password for obtaining access to the LAN GUI based on the MAC address of the client device determined to not be in the LAN GUI access whitelist.

15. A non-transitory, computer-readable media having computer-readable instructions stored thereon, the computer-readable instructions being capable of being read by a client device of one or more client devices, wherein the computer-readable instructions are capable of instructing the client device to perform a method to access a local area network (LAN) without using a password, comprising:

storing a LAN graphical user interface (GUI) access whitelist in memory;

receiving a request for access by the client device to a LAN GUI that presents network information, wherein the LAN GUI is used to any of configure access to a network, configure one or more network parameters, manage operation of the network device, or any combination thereof;

analyzing the LAN GUI access whitelist;

determining whether the client device is in the LAN GUI access whitelist, wherein the LAN GUI access whitelist comprises one or more MAC addresses of one or more client devices, and wherein at least one of the one or more MAC addresses, entered by a user via the LAN GUI, is a new MAC address different from an assigned MAC address by a device manufacturer; and controlling access by the client device to the LAN GUI based on determining whether the client device is in the LAN GUI access whitelist, wherein access includes viewing a password to access the LAN GUI, accessing network information, or both.

16. The non-transitory, computer-readable media of claim 15 further comprising granting the client device access to the LAN GUI without receiving the password from the client device based on the client device determined to be present in the LAN GUI access whitelist.

17. The non-transitory, tangible, computer-readable media of claim 15 further comprising presenting a login page for entering the password for the client device to access the LAN GUI based on a MAC address of the client device determined to not be present in the LAN GUI access whitelist.

18. The non-transitory, computer-readable media of claim 15 further comprising:
   presenting a first page to add a MAC address of the client device to the LAN GUI access whitelist based on the client device having access to the LAN GUI; and
   presenting a login page for entering the password for obtaining access to the LAN GUI based on a MAC address of the client device determined to not be in the LAN GUI access whitelist.

19. The non-transitory, computer-readable media of claim 18 further comprising receiving the password entered by the client device on the login page presented to the client device.

20. The non-transitory, computer-readable media of claim 15 further comprising:
   presenting a first page to add a MAC address of the client device to the LAN GUI access whitelist based on the client device having access to the LAN GUI;
   presenting a second page of the LAN GUI to display the password for access to the LAN GUI based on a MAC address of the client device determined to be in the LAN GUI access whitelist; and
   presenting a third page for entering the password for obtaining access to the LAN GUI based on the MAC address of the client device determined to not be in the LAN GUI access whitelist.

* * * * *